United States Patent
Kaushik et al.

(10) Patent No.: US 12,266,123 B1
(45) Date of Patent: Apr. 1, 2025

(54) MONITORING THE SAFE DISTANCE BETWEEN VEHICLES WHILE DRIVING

(71) Applicant: Samsara Inc., San Francisco, CA (US)

(72) Inventors: Suryakant Kaushik, Austin, TX (US); Cole Jurden, Kansas City, MO (US); Marc Clifford, London (GB); Robert Koenig, Edinburgh (GB); Abner Ayala, Orlando, FL (US); Kevin Lai, Redmond, WA (US); Jose Cazarin, Calgary (CA); Margaret Irene Finch, Austin, TX (US); Rachel Demerly, New York, NY (US); Nathan Hurst, Seattle, WA (US); Yan Wang, Mercer Island, WA (US); Akshay Raj Dhamija, Campbell, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/672,665

(22) Filed: May 23, 2024

(51) Int. Cl.
*G06T 7/50* (2017.01)
*G06V 10/774* (2022.01)
(Continued)

(52) U.S. Cl.
CPC .............. *G06T 7/50* (2017.01); *G06V 10/774* (2022.01); *G06V 10/945* (2022.01); *G06V 20/41* (2022.01);
(Continued)

(58) Field of Classification Search
CPC . G06T 7/50; G06T 2207/20092; G06V 20/58; G06V 20/41; G06V 10/774; G06V 10/945; G06V 2201/08
See application file for complete search history.

(56) References Cited

U.S. PATENT DOCUMENTS 6,737,963 B2 * 5/2004 Gutta .................... B60Q 9/008
348/148
9,542,847 B2 1/2017 Sherony et al.
(Continued)

FOREIGN PATENT DOCUMENTS

KR 20180047149 5/2018

OTHER PUBLICATIONS

"Unprecedented Visibility More Platform Power Everything You Need To Know From the Vision 24 Motive Innovation Summit", [Online]. Retrieved from the Internet: https: gomotive.com blog vision-24-product-announcements , (Apr. 10, 2024), 13 pgs.
(Continued)

*Primary Examiner* — Mohamed A. Wasel
(74) *Attorney, Agent, or Firm* — Schwegman Lundberg & Woessner, P.A.

(57) ABSTRACT

Methods, systems, and computer programs are presented for monitoring tailgating when a vehicle follows another vehicle at an unsafe distance. A method for enhancing a Following Distance (FD) machine learning (ML) model is disclosed. The method includes providing a management user interface (UI) for configuring FD parameters, followed by receiving FD events. A UI for manual FD annotation and another for customer review of filtered FD events are also provided. Annotations and customer review information are collected to improve the training set for the FD ML model. The FD model is then trained with the new data and downloaded to a vehicle. Once installed, the FD model is utilized to detect FD events within the vehicle, thereby enhancing the vehicle's safety and performance in driving scenarios by improving the accuracy and reliability of FD event predictions or detections.

20 Claims, 12 Drawing Sheets

(51) Int. Cl.
    *G06V 10/94*      (2022.01)
    *G06V 20/40*      (2022.01)
    *G06V 20/58*      (2022.01)
    *H04N 7/18*      (2006.01)

(52) U.S. Cl.
    CPC ............ *G06V 20/58* (2022.01); *H04N 7/183* (2013.01); *G06T 2200/24* (2013.01); *G06T 2207/10016* (2013.01); *G06T 2207/20092* (2013.01); *G06T 2207/30252* (2013.01); *G06V 2201/08* (2022.01)

(56) References Cited

U.S. PATENT DOCUMENTS

| | | | |
|---|---|---|---|
| 10,155,445 | B2 | 12/2018 | Nemat-Nasser |
| 10,173,685 | B2 | 1/2019 | Schaper et al. |
| 10,272,838 | B1 | 4/2019 | Pertsel |
| 10,745,009 | B2 | 8/2020 | Jang et al. |
| 11,318,949 | B2 | 5/2022 | El Kaliouby et al. |
| 11,352,013 | B1 | 6/2022 | Srinivasan et al. |
| 11,386,325 | B1 | 7/2022 | Srinivasan et al. |
| 11,507,857 | B2 * | 11/2022 | Sicconi ................. G06V 20/56 |
| 11,830,259 | B2 | 11/2023 | Ren et al. |
| 11,989,949 | B1 * | 5/2024 | Mazumder ........... G06V 10/774 |
| 11,993,277 | B2 | 5/2024 | Julian et al. |
| 12,056,922 | B2 | 8/2024 | Tsai et al. |
| 12,112,555 | B1 | 10/2024 | Lee et al. |
| 2007/0013498 | A1 * | 1/2007 | Knoll ..................... G08G 1/167 340/438 |
| 2007/0159311 | A1 * | 7/2007 | Schober .................. B60Q 5/00 340/435 |
| 2012/0147189 | A1 | 6/2012 | Zhang |
| 2012/0206252 | A1 | 8/2012 | Sherony et al. |
| 2017/0001520 | A1 | 1/2017 | Nemat-nasser |
| 2018/0170375 | A1 | 6/2018 | Jang et al. |
| 2019/0310654 | A1 | 10/2019 | Halder |
| 2019/0389487 | A1 * | 12/2019 | Gowda .................. B60Q 1/507 |
| 2020/0125861 | A1 | 4/2020 | Sota et al. |
| 2020/0228646 | A1 * | 7/2020 | Hotes ................ H04M 1/72463 |
| 2020/0342235 | A1 | 10/2020 | Tsai et al. |
| 2021/0179092 | A1 * | 6/2021 | Chen ..................... B60W 10/04 |
| 2021/0350472 | A1 * | 11/2021 | Potter .................... G06Q 40/08 |
| 2022/0126864 | A1 | 4/2022 | Moustafa et al. |
| 2022/0289203 | A1 | 9/2022 | Makilya et al. |
| 2022/0324467 | A1 | 10/2022 | Alvarez et al. |
| 2023/0065491 | A1 | 3/2023 | Ren et al. |
| 2023/0112797 | A1 * | 4/2023 | Sicconi .................. G06V 10/46 705/26.7 |
| 2023/0154204 | A1 | 5/2023 | Kahn et al. |
| 2023/0219592 | A1 | 7/2023 | Calmer et al. |
| 2023/0298410 | A1 | 9/2023 | Calmer et al. |
| 2023/0303101 | A1 | 9/2023 | Kuehnle et al. |
| 2024/0053763 | A1 | 2/2024 | Halder |
| 2024/0062667 | A1 | 2/2024 | Kemble et al. |
| 2024/0096116 | A1 | 3/2024 | Alpert et al. |
| 2024/0198180 | A1 | 6/2024 | Chen et al. |
| 2024/0208522 | A1 | 6/2024 | Verma et al. |
| 2024/0219716 | A1 * | 7/2024 | Chen ........................ B62J 50/22 |

OTHER PUBLICATIONS

"U.S. Appl. No. 18/634,353, Notice of Allowance mailed Jul. 17, 2024", 9 pgs.

"U.S. Appl. No. 18/643,164, Notice of Allowance mailed Aug. 12, 2024", 5 pgs.

"U.S. Appl. No. 18/664,773, Non Final Office Action mailed Aug. 28, 2024", 10 pgs.

"U.S. Appl. No. 18/750,793, Non Final Office Action mailed Aug. 30, 2024", 15 pgs.

"U.S. Appl. No. 18/643,164, Corrected Notice of Allowability mailed Nov. 12, 2024", 2 pgs.

"U.S. Appl. No. 18/664,773, Response filed Nov. 20, 2024 to Non Final Office Action mailed Aug. 28, 2024", 12 pgs.

"U.S. Appl. No. 18/750,793, Response filed Nov. 21, 2024 to Non Final Office Action mailed Aug. 30, 2024", 16 pgs.

"U.S. Appl. No. 18/808,818, Non Final Office Action mailed Nov. 26, 2024", 11 pgs.

"U.S. Appl. No. 18/923,359, Non Final Office Action mailed Dec. 5, 2024", 8 pgs.

* cited by examiner

MONITORING THE SAFE DISTANCE BETWEEN VEHICLES WHILE DRIVING

TECHNICAL FIELD

The subject matter disclosed herein generally relates to vehicle safety technologies, including methods, systems, and machine-readable storage media for monitoring driving behaviors and improving road safety.

BACKGROUND

Fleet managers rely on the analysis of images from inside and outside vehicles to determine events that affect the safe driving of the vehicle, such as improper driver behavior, accident investigation, speeding, tailgating, hazardous conditions, etc. One dangerous situation is when drivers follow too close the vehicle in front without leaving a safe stopping distance, which is commonly known as tailgating. This behavior is considered dangerous and increases the risk of accidents, especially if the lead vehicle suddenly breaks or encounters an obstacle. Tailgating reduces the driver's reaction time and limits their ability to maneuver safely. It is important for drivers to maintain a safe following distance to ensure their own safety and the safety of others on the road.

BRIEF DESCRIPTION OF THE DRAWINGS

Various appended drawings illustrate examples of the present disclosure and cannot be considered limiting its scope.

DETAILED DESCRIPTION

Example methods, systems, and computer programs are directed at the surveillance and management of vehicular spacing. Examples merely typify possible variations. Unless explicitly stated otherwise, components and functions are optional and may be combined or subdivided, and operations may vary in sequence or be combined or subdivided.

In the following description, numerous specific details are set forth to provide a thorough understanding of examples. However, it will be evident to one skilled in the art that the present subject matter may be practiced without these specific details.

Methods, systems, and computer programs are presented for the surveillance and management of vehicular spacing. A method for enhancing a Following Distance (FD) machine learning (ML) model is disclosed. The method includes providing a management user interface (UI) for configuring FD parameters, followed by receiving FD events. A UI for manual FD annotation and another for customer review of filtered FD events are also provided. Annotations and customer review information are collected to improve the training set for the FD ML model. The FD model is then trained with the new data and downloaded to a vehicle. Once deployed, the FD model is utilized to detect FD events within the vehicle, thereby enhancing the vehicle's safety and performance in driving scenarios by improving the accuracy and reliability of FD event predictions or detections.

Glossary of Terms

Some of the concepts used for the description of the solution are presented below.

Vehicle Spacing refers to the distance or gap between one vehicle and another while in motion, typically measured in terms of time or length. It encompasses the concepts of Following Distance, Distance to Leading Vehicle, and Safe Headway, which are critical for maintaining safe driving conditions and preventing collisions.

Following Distance (FD) is the amount of time that it would take a vehicle to reach the back of another vehicle in front if the vehicle in front would stop instantaneously.

Distance to Leading Vehicle (DLV) is the amount of space (measured in meters of another unit of length) between the front of a vehicle and the back of the vehicle in front.

Safe Headway (also referred to herein as gap) is the time needed to come to a complete stop without collision if the leading vehicle comes to a complete stop.

Figure 1:
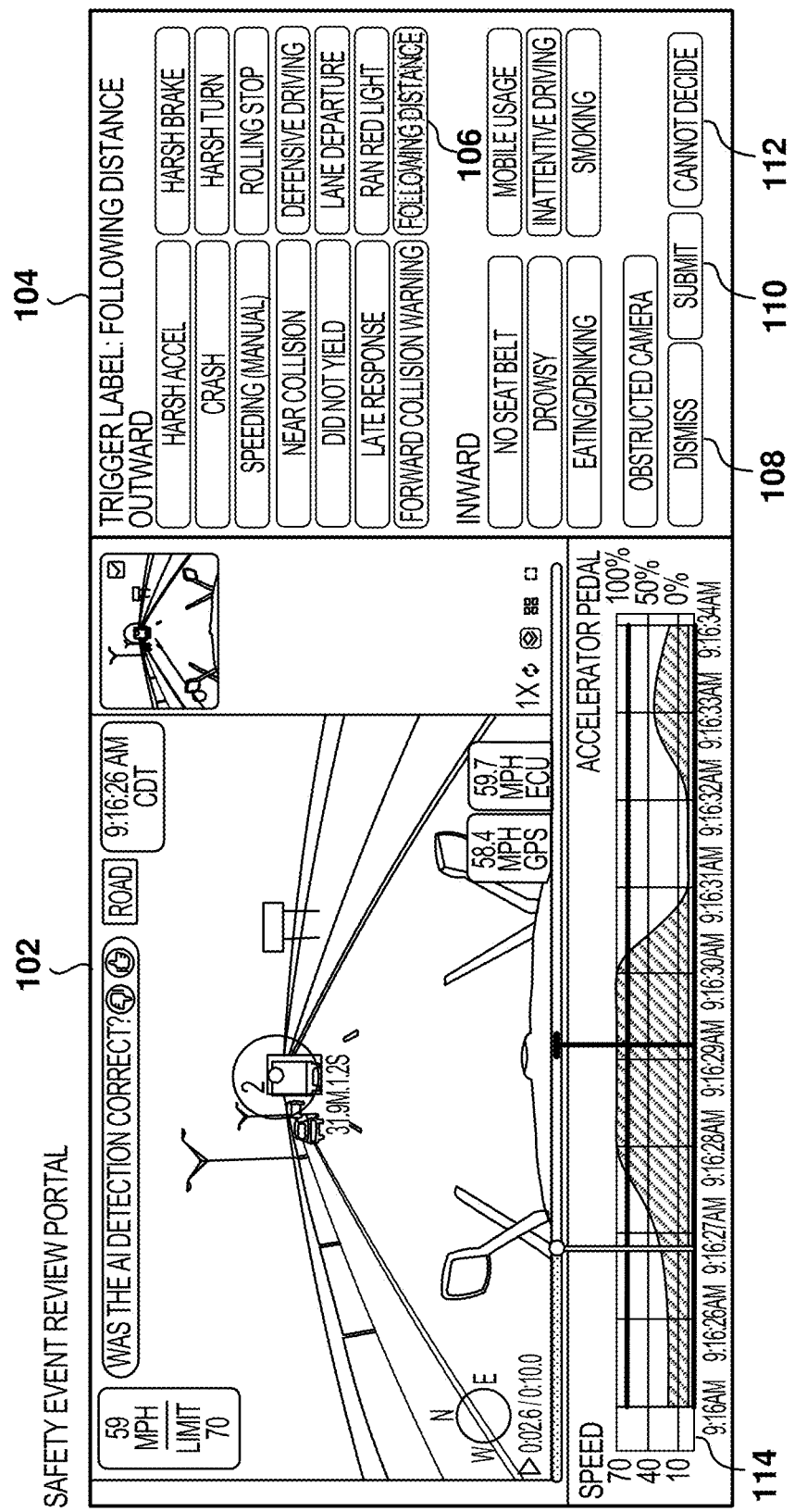
FIG. 1 is a user interface (UI) for annotating tailgating events, according to some examples.

FIG. 1 is a user interface (UI) for annotating tailgating events, according to some examples. FIG. 1 illustrates an exemplary user interface of a Safety Event Review Portal for monitoring and reviewing vehicle safety events. The interface is divided into three sections: a video playback area 102, an event timeline 114, and a trigger label panel 104.

The video playback area 102 displays recorded footage of the vehicle's surroundings captured by onboard cameras. This area includes overlaid graphics, such as bounding boxes that indicate the detection of objects, such as the vehicle in front. Additional information, such as vehicle speed, is displayed alongside the video feed.

Below the video playback area is the event timeline 114, which provides a graphical representation of the vehicle's speed over time and highlights the duration of the safety event. The event timeline 114 includes a playback scrubber that allows users to navigate through the recorded event. By moving the position of the scrubber along the timeline, users can pinpoint and view specific moments in time within the video. The data presented within the event timeline 114, such as vehicle speed or other telematics, corresponds directly to the content being displayed in the video at that particular moment.

The trigger label panel 104 is organized into three sections, each with interactive elements for categorizing the nature of the safety event. The first section includes outward-facing events such as harsh acceleration, crash, and following distance 106. The second section lists inward-facing events that may involve the driver, including, but not limited to: no seat belt usage; drowsiness; and mobile usage.

The third section contains action buttons for categorizing the event. The action buttons include a dismiss button 108, a submit button 110, and a cannot decide button 112. The dismiss button 108 is for dismissing the event because the review showed that the respective event did not really happen (e.g., the driver was not following too closely. This dismissal is referred to herein as a false positive. The submit button 110 is to confirm that the event happened, referred to herein as a true positive.

When the event is dismissed, the dismissed event will not be shown to the end-user, which saves time for the end user so the end user does not have to waste time inspecting false positives. When the event is not dismissed, the event will be reported to the end user.

Increasing the distance between a vehicle and the vehicle ahead can help give the driver the time needed to recognize a hazard and respond safely. The National Safety Council recommends a minimum three-second following distance. In this case, the following distance is considered in terms of time, not space. With a standard of 2.5 seconds, highway engineers use time, rather than distance, to represent how long it takes a driver to perceive and react to hazards. The National Safety Council also uses this standard (plus a little extra for safety) when recommending the three-second rule for following distance.

Thus, although "distance" is commonly used to refer to length, the term "distance" when discussing tailgating refers to the amount of time it would take to reach the vehicle in front. This is why Following Distance (FD) is defined herein as the amount of time that it would take a vehicle to reach the back of another vehicle in front if the vehicle in front would stop instantaneously.

Determining the three-second gap is relatively easy. When following a vehicle, a marker on the road can be selected (e.g., an overhead road sign, a tree, or a line end on the road). Then, note when the vehicle ahead passes that marker and see the amount of time it takes for the trailing vehicle to reach that marker. In some cases, the safe FD may increase based on conditions, such as harsh weather or fatigue on the driver because of a long driving segment.

In some examples, a machine-learning (ML) model is used to identify FD events, which are events where the driver is following too closely, based on images captured by the forward-facing camera in the vehicle. However, the accuracy of the ML model may be improved to reduce the number of false positives and increase the number of false negatives to make sure all the FD events are flagged for review.

To improve the accuracy of the ML model and reduce the number of false positives, techniques are presented to collect information from reviewers in order to get better estimates of the FD and capture this information to improve the training set for the ML model.

Figure 2:
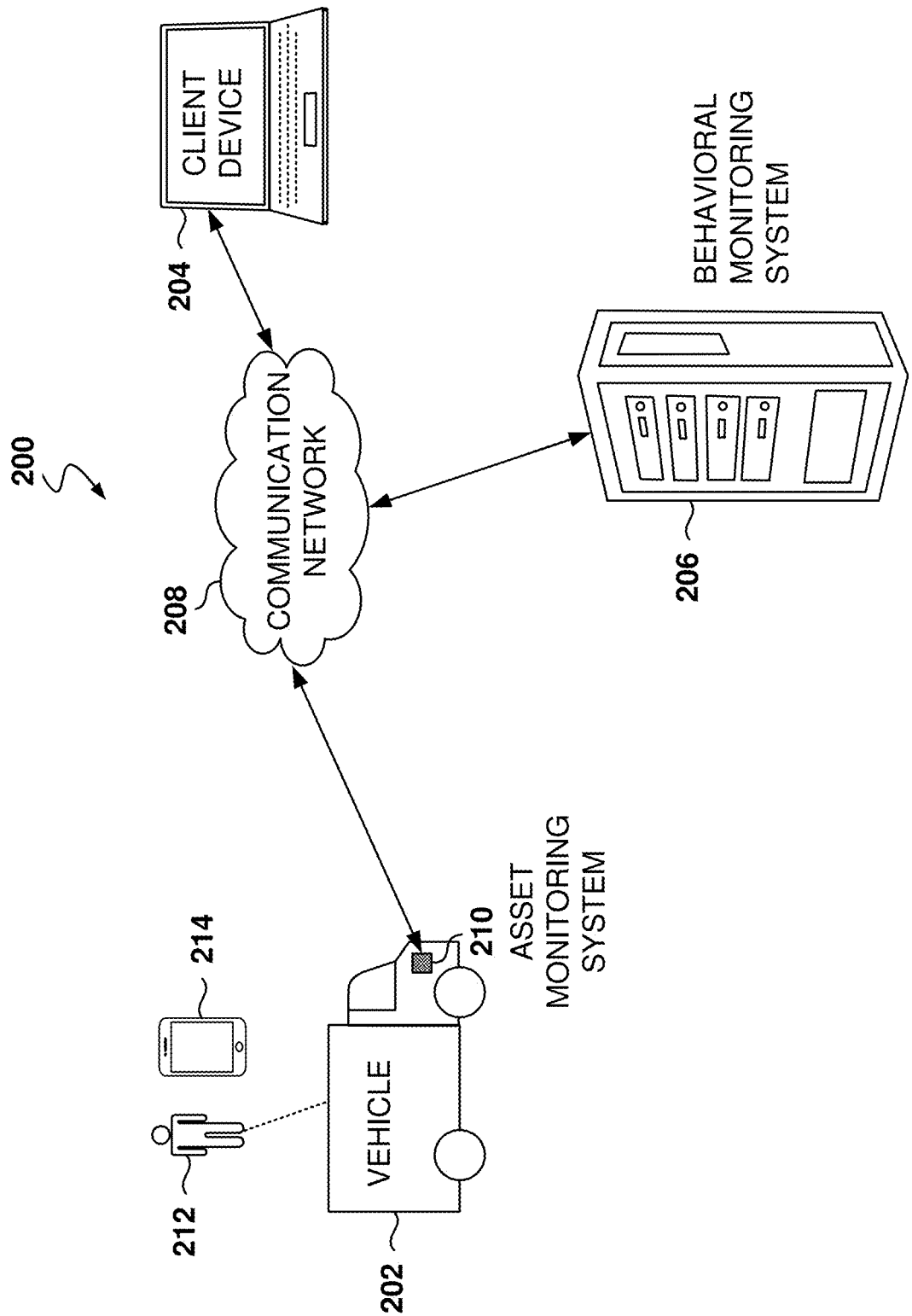
FIG. 2 shows a system for vehicle rider behavioral monitoring, according to some examples.

FIG. 2 shows a system 200 for vehicle rider behavioral monitoring, according to some examples. As shown, multiple devices (e.g., vehicle 202, client device 204, and behavioral monitoring system 206) are connected to a communication network 208 and configured to communicate with each other through the communication network 208. The communication network 208 is any type of network, including a local area network (LAN), such as an intranet, a wide area network (WAN), such as the internet, a mobile telephone network, a satellite communications network, or any combination thereof. The communication network 208 is implemented using any number of communication links associated with one or more service providers, including one or more wired communication links, one or more wireless communication links, or any combination thereof.

The vehicle 202 may be any type of vehicle or combination vehicle, such as an automobile, semi-trailer truck, trailer, plane, train, ship, and the like. Further, the techniques presented herein may be used with other non-moving assets that are operated by an operator (e.g., cranes, manufacturing equipment, call centers) and assets that are controlled remotely (e.g., drones, air traffic controllers). The examples described herein should therefore not be interpreted to be exclusive or limiting, but rather illustrative.

As shown, the vehicle 202 includes an asset monitoring system (AMS) 210 that allows for monitoring events at the vehicle and exchanging information and commands between the vehicle 202 and one or more remote computing devices via the communication network 208.

The asset monitoring system 210 may include one or more hardware devices to perform monitoring functions at the vehicle. In some examples, the AMS 210 includes a communications device that is a hardware device that acts as a network access point for the AMS 210. For example, the communications device can be established as an edge device of a network or system of nodes within the vehicle 202.

The AMS may include a variety of sensors, computing devices (e.g., electronic control units (ECUs), actuators, etc., deployed within the vehicle. The communications device in the AMS facilitates wireless communication capabilities by connecting to wireless networks (e.g., cellular, wireless local area network, satellite communication networks, etc.) for communicating with remote computing devices. The communications device may also provide additional functionality, such as firewall functionality to filter inbound and outbound communications, disallow incoming communications from suspicious or unauthorized sources, etc.

The asset monitoring system 210 allows the vehicle 202 to transmit data, such as sensor data gathered by sensors in the vehicle 202, to a remote computing device. The vehicle 202 may be equipped with a variety of sensors that capture data describing the performance of the vehicle 202, actions performed by riders in and around the vehicle 202, and the vehicle's surrounding environment.

The behavioral monitoring system 206 is a computing system consisting of one or more computing devices configured to provide remote behavioral monitoring of a vehicle 202 to detect different conditions of driver state and execute corresponding responses. For example, the behavioral monitoring system 206 may allow a user, such as a fleet manager administrator, to define a set of triggering conditions and criteria for detecting and responding to undesirable behavior or dangerous conditions.

To utilize the functionality of the behavioral monitoring system 206, users (e.g., administrators and fleet managers) may use the client device 204. Although the shown system 200 includes only one client device 204 and one vehicle 202, this is only for ease of explanation and is not meant to be limiting. One skilled in the art would appreciate that the system 200 could include any number of client devices 204 and vehicles 202. Further, the behavioral monitoring system 206 may concurrently accept communications from and initiate communication messages and interact with any number of client devices 204 and vehicles 202, and support connections from a variety of different types of client devices 204.

A user may interact with the behavioral monitoring system 206 via a client-side application installed on the client device 204. In some examples, the client-side application includes a component specific to the behavioral monitoring system 206. For example, the component may be a stand-alone application, one or more application plug-ins, or a browser extension. However, the users may also interact with the behavioral monitoring system 206 via a third-party application, such as a web browser or messaging application, that resides on the client device 204 and is configured to communicate with the behavioral monitoring system 206. In either case, the client-side application presents a user interface (UI) for the user to interact with the behavioral monitoring system 206.

The behavioral monitoring system 206 may provide a user interface that allows administrators to configure the triggering conditions. Each triggering condition defines one or more individual conditions that, if satisfied, indicates the occurrence of an undesirable behavior or a critical event such as a collision. For example, a triggering condition may define one or more terms or a string of terms that, if spoken, indicate the use of offensive, derogatory, and otherwise undesirable language. As another example, a triggering condition may define physical motions and motion thresholds that, if performed, indicate violent, dangerous, and otherwise undesirable movements.

Each triggering condition may also be associated with a corresponding set of response actions to be performed by the behavioral monitoring system 206 if the triggering condition has been satisfied. For example, the response actions may include notifying the driver of a dangerous condition (e.g., drowsy driving), transmitting alerts to specified users/user devices, generating incident reports based on corresponding triggering conditions, modifying the mode of operation of sensors or the vehicle, and the like.

The user interface also enables the administrators to define corresponding actions to be performed in the event that a triggering condition has been satisfied/triggered. For example, the user interface enables the administrator to define contact identifiers (e.g., email addresses, phone numbers, etc.) to which notifications are to be sent. Similarly, the user interface enables the administrator to define actions for generating an incident report based on the detected occurrence of undesirable behavior. For example, the user interface enables the administrator to define a modified mode of operation of the sensors in the vehicle 202 to be initiated to capture additional data for inclusion in the incident report. This may include increasing the number of sensors used to capture data, such as by initiating the use of video cameras or microphones, increasing the performance of the sensors that are in use, such as by increasing the resolution used to capture video, and modifying the positioning of the sensors, such as by changing the angle or view of a camera to better capture the detected action.

Further, a driver 212 may interact with the behavioral monitoring system 206 and the AMS 210 via a mobile device 214. A BMS app may execute on the mobile device 214 and connect (e.g., via wireless communication such as cellular, WiFi, or Bluetooth) to the AMS 210 and the behavioral monitoring system 206 to perform operations related to the BMS, such as getting information for a trip, receiving feedback regarding in-vehicle behavior, attend training, etc. Alternatively, the driver 212 may access the same functionality via a web browser executing on the mobile device 214.

Figure 3:
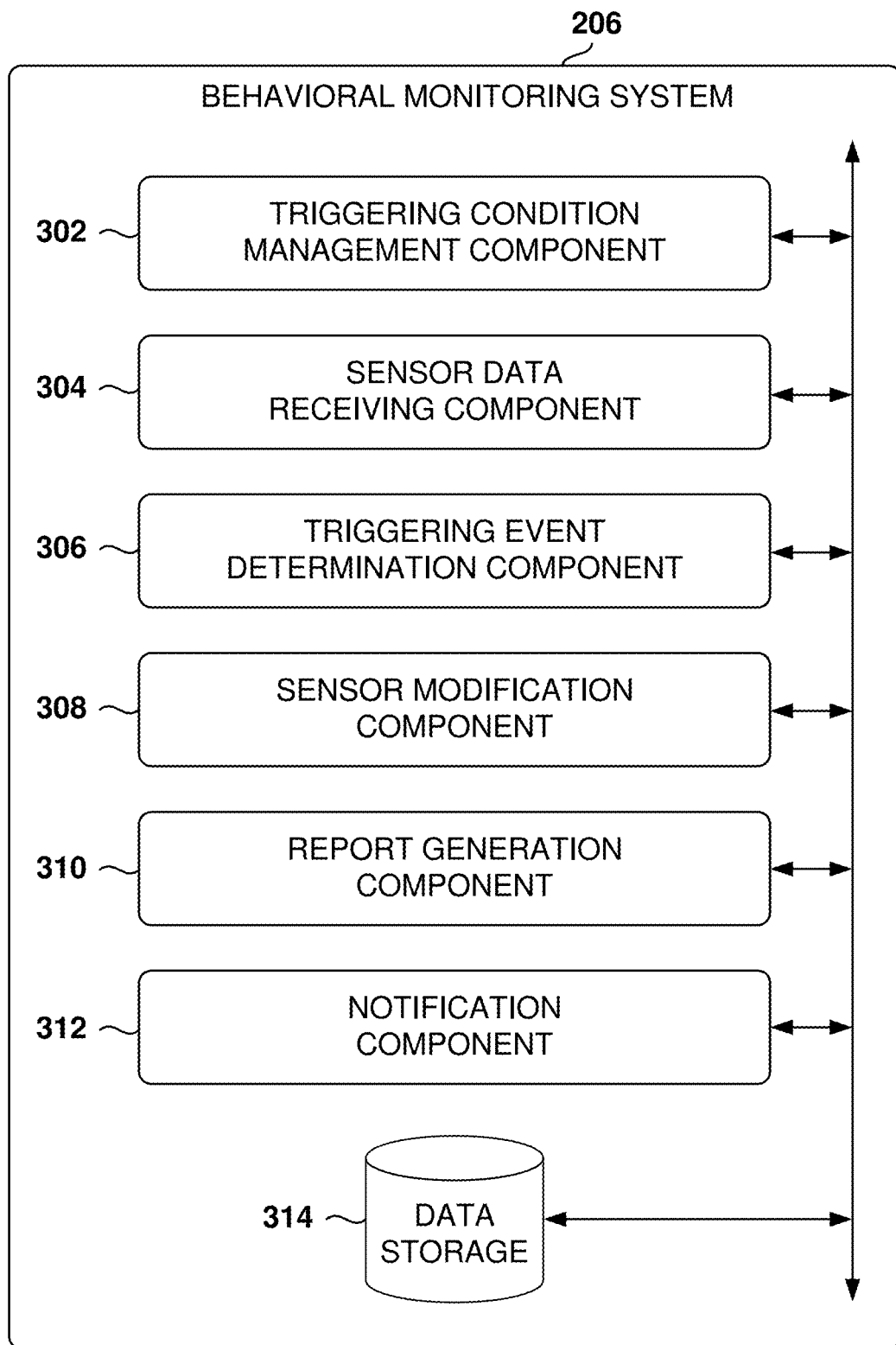
FIG. 3 is a block diagram of a Behavioral Monitoring System (BMS), according to some examples.

FIG. 3 is a block diagram of a behavioral monitoring system 206 (BMS), according to some examples. To avoid obscuring the inventive subject matter with unnecessary detail, various functional components (e.g., modules) that are not germane to conveying an understanding of the inventive subject matter have been omitted from FIG. 3. The various functional components depicted in FIG. 3 may reside on a single computing device or may be distributed across several computing devices in various arrangements, such as those used in cloud-based architectures.

The behavioral monitoring system 206 includes a triggering condition management component 302, a sensor data receiving component 304, a triggering event determination component 306, a sensor modification component 308, a report-generation component 310, a notification component 312, and a data storage 314.

The triggering condition management component 302 facilitates the generation and modification of triggering conditions. For example, triggering condition management component 302 provides a graphical user interface that allows administrators to generate and modify triggering conditions. Each triggering condition defines one or more individual conditions that, if satisfied, indicates the occurrence of an undesirable behavior, as well as a corresponding set of response actions to be performed if the triggering condition has been satisfied. The user interface provided by the triggering condition management component 302 enables administrators to define the triggering conditions. Triggering conditions may include any one or combination of specific criteria or parameters that, when met or surpassed, prompts a predetermined or user-defined response within the system. For example, such conditions can include: thresholds; the detection of image features from camera feeds; anomalies in sensor data, such as irregular steering or braking patterns; behavioral patterns, including, for example, a lack of interaction with vehicle controls or infrequent checks of mirrors; as well as the presence of certain environmental factors like the time of day, adverse weather conditions, or high traffic density.

Similarly, an administrator may use the user interface elements to define corresponding actions to be performed in the event that a triggering condition has been triggered. In some examples, the triggering condition management component 302 stores the generated triggering conditions in the data storage 314. The stored triggering conditions may be associated with an account and fleet identifier that identifies the account, vehicle fleet, or vehicles to which the triggering conditions are associated.

The sensor data receiving component 304 receives sensor data from the vehicles 202, including data from the sensors in the AMS 210. The sensor data receiving component 304 provides the sensor data to the other components of the behavioral monitoring system 206 for use in detecting the occurrence of undesirable behavior. The sensor data receiving component 304 may also store the sensor data in the data storage 314, where it may be accessed by the other components of the behavioral monitoring system 206. For example, the stored sensor data may be associated with a unique identifier associated with the vehicle 202 from which the sensor data was received. The sensor data may also include timestamp data indicating the time at which the sensor data was captured by the sensors of the vehicle 202 or when the sensor data was received by the behavioral monitoring system 206.

The triggering event determination component 306 uses the sensor data received by the sensor data receiving component 304 to determine whether any of the triggering conditions have been satisfied. In some examples, a triggering condition may be based on a combination of individual conditions, such as a combination of detecting specified terms, detecting specified motions, or detecting a specified volume level. In these types of examples, the triggering event determination component 306 may use the sensor data to determine that each of the individual conditions has been satisfied within a predetermined time window, such as within a five-second window. For example, the triggering event determination component 306 may use timestamp data associated with the sensor data to determine whether each of the individual conditions was satisfied within the predetermined time window. Accordingly, the triggering condition is satisfied when each of the individual conditions occurs within the predetermined time window.

The triggering event determination component 306 notifies the other components of the behavioral monitoring system 206 if a triggering condition has been triggered.

The sensor modification component 308 modifies the operating mode of sensors in the vehicle 202. In some cases, an administrator or fleet manager may wish to capture additional or higher-quality sensor data to document a detected incident of undesirable behavior. For example, the administrator or fleet manager may wish to initiate the use of sensors, such as cameras, microphones, and the like, to capture sensor data and document the incident.

The report-generation component 310 generates an incident report to document a detected occurrence of undesirable behavior. The incident report may include any of a variety of data defined by an administrator in a triggering condition. For example, an incident report may include data identifying the vehicle 202, the time of the incident, the action that satisfied the triggering condition (e.g., detected terms, action, etc.), as well as captured sensor data depicting the incident. The report-generation component 310 may store the incident report in the data storage 314, where an administrator or other authorized user may access it.

The notification component 312 generates and transmits a notification to users defined by the triggering condition. For example, the notification component 312 identifies a contact identifier corresponding to the triggering event. An administrator may define the contact identifier when generating the triggering event. The contact identifier provides contact details for reaching a user designated to receive a notification when the triggering event is triggered. For example, the contact identifier may be an email address, phone number, and the like.

The notification component 312 may then transmit a notification directed to the content identifier. The notification may provide details of the detected incident, such as a description of the undesirable behavior, time, associated vehicle 202, and the like. The notification may also enable a user to access an incident report associated with the detected incident.

Figure 4:
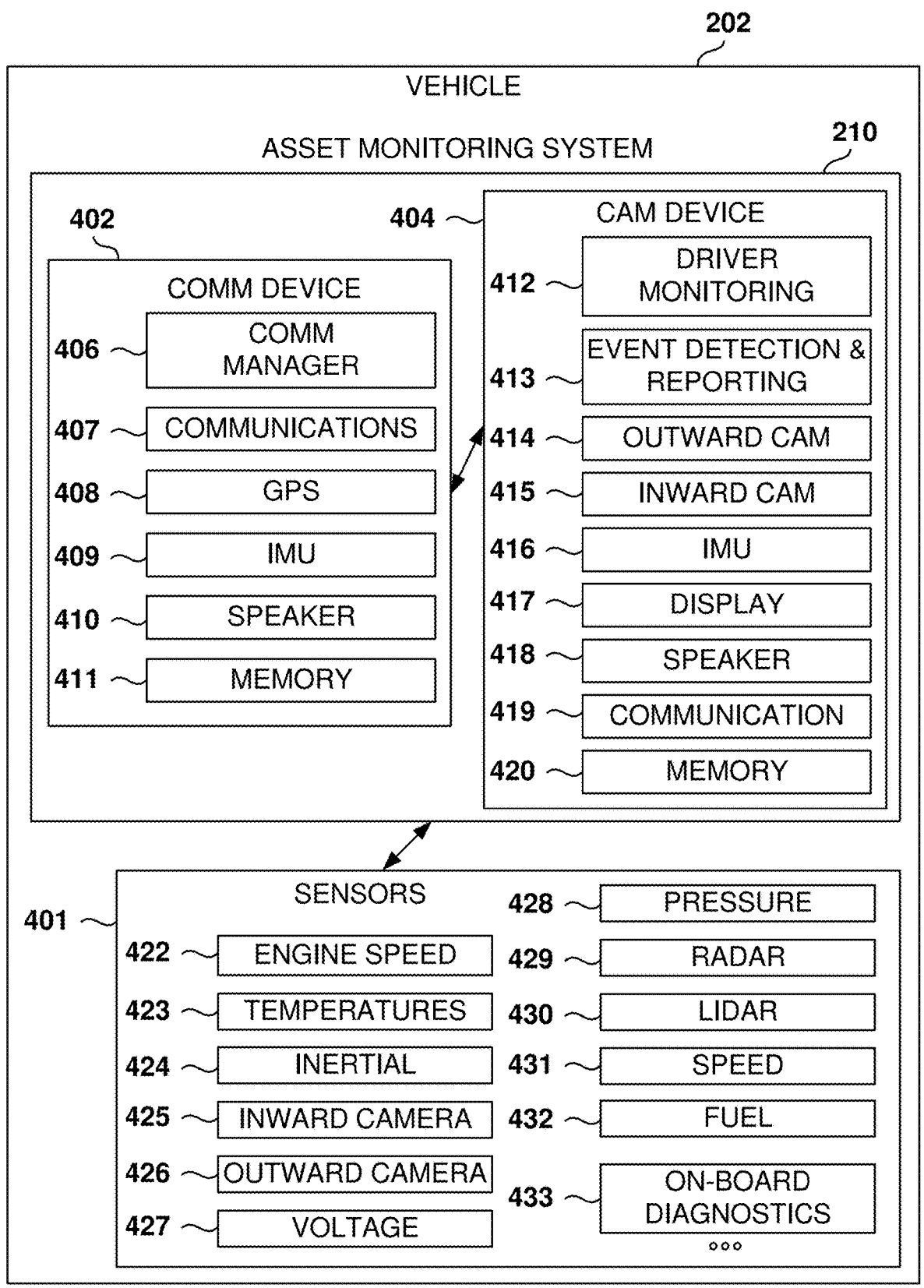
FIG. 4 illustrates the components of a vehicle for rider behavioral monitoring, according to some examples.

FIG. 4 illustrates components of a vehicle 202 for rider behavioral monitoring, according to some examples. The vehicle 202 includes the asset monitoring system 210 and a plurality of sensors 401. The AMS 210 may include a single device or distribute its functions across a plurality of devices in the vehicle (e.g., sensors, processors, communications devices) that are able to communicate among themselves. In the illustrated example, the AMS 210 includes a comm device 402 and a cam device 404, but other examples may utilize different numbers of devices or distribute their functionality differently.

The comm device 402 provides communication services within the vehicle and the network and may connect to the diagnostic port in the vehicle to gather vehicle information. In some examples, the comm device 402 includes a communications manager 406, a communications module 407, a Global Positioning System (GPS) 408, Inertial Measurement Unit (IMU) 409, a speaker 410, computer memory 411 (RAM and permanent storage), and one or more processors (not shown). The GPS 408 and the IMU 409 may be used, together or separately, to calculate the speed of the vehicle.

The communications manager 406 coordinates communications with the BMS and other devices in the vehicle, such as the cam device 404. The communications module 407 provides one or more communication interfaces, such as mobile telephony, satellite communications, WiFi, Bluetooth, etc. Further, the communications manager 406 may provide a WiFi hotspot to other devices in the vehicle so these devices can communicate to the network via the WiFi hotspot.

The IMU 409 sensor detects the motion and orientation of the vehicle, and the memory 411 stores data collected during the operation of the vehicle and programs that may be executed on the comm device 402.

In some examples, the cam device 404 includes a driver monitoring 412 module, an event detection and reporting system 413, an outward camera 414 that captures images in the direction of travel, an inward camera 415 that captures images of the vehicle cabin, an IMU 416, a display 417 (e.g., a touchscreen, computer display, LED lights), a speaker 418, a communications module 419, a memory 420, and a processor (not shown). The inward camera 415 is installed within the vehicle cabin to monitor the driver and passengers, while the outward camera 414 provides visual information about the environment surrounding the vehicle.

The driver monitoring 412 module performs one or more activities regarding driver behavior, such as FD detection, driving while drowsy, sudden breaking, etc. The event detection and reporting system 413 is configured to identify and log significant events based on sensor data. The display 417 provides visual feedback and information to the vehicle occupants, while the speaker 418 provides auditory information or alerts. Further, the memory 420 stores data collected during the operation of the vehicle and programs that may be executed on the cam device 404.

In some examples, the cam device 404 is configured to execute the machine learning models described below, but other examples may execute the machine learning models in the comm device 402. Other configurations may include additional devices within the AMS 210 or consolidate all functions within a single device.

In some examples, the comm device 402 and the cam device 404 are connected via a hardwire connection (e.g., USB), and the cam device 404 may be powered via this hardwire connection. In some examples, the comm device 402 draws power from the vehicle's electrical system. Further, the AMS may include other sensors, such as any of the sensors 401. The AMS 210 is configured to communicate with any of the sensors 401 in the vehicle.

The sensors 401 are configured to monitor various parameters and states of the vehicle. In some examples, the sensors 401 include an engine speed sensor 422 that measures the revolutions per minute of the engine, temperature sensors 423 that measure various temperature points in the vehicle (e.g., cabin, engine, outside), and inertial sensors 424 that detect motion and orientation of the vehicle. The sensors 401 may also include an inward camera 425, an outward camera 426, a voltage sensor 427 that monitors the electrical system of the vehicle, and pressure sensors 428, which detect the pressure in various systems such as tires or hydraulic systems. Further, the sensors 401 may include radar sensors 429 and Light Detection and Ranging (LIDAR) sensors 430, which provide distance and mapping capabilities for the vehicle's surroundings. A speed sensor 431 measures the traveling speed of the vehicle, and fuel sensors 432 monitor the amount of fuel in the tank. The vehicle may also include an on-board diagnostics system 433 for self-diagnosis and reporting of the operational status of the vehicle 202.

Figure 5A:
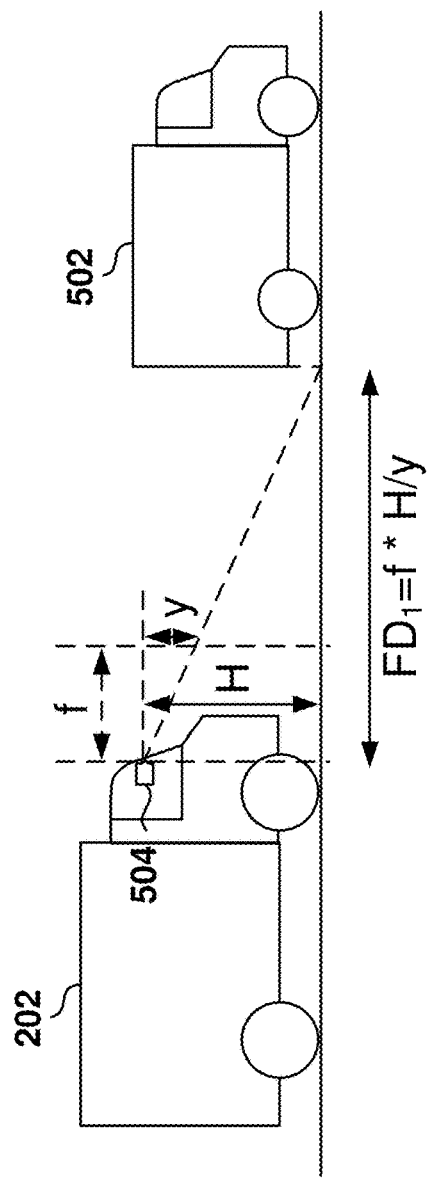
FIGS. 5A-5B illustrate methods to calculate the following distance to the vehicle in front, according to some examples.
Figure 5B:
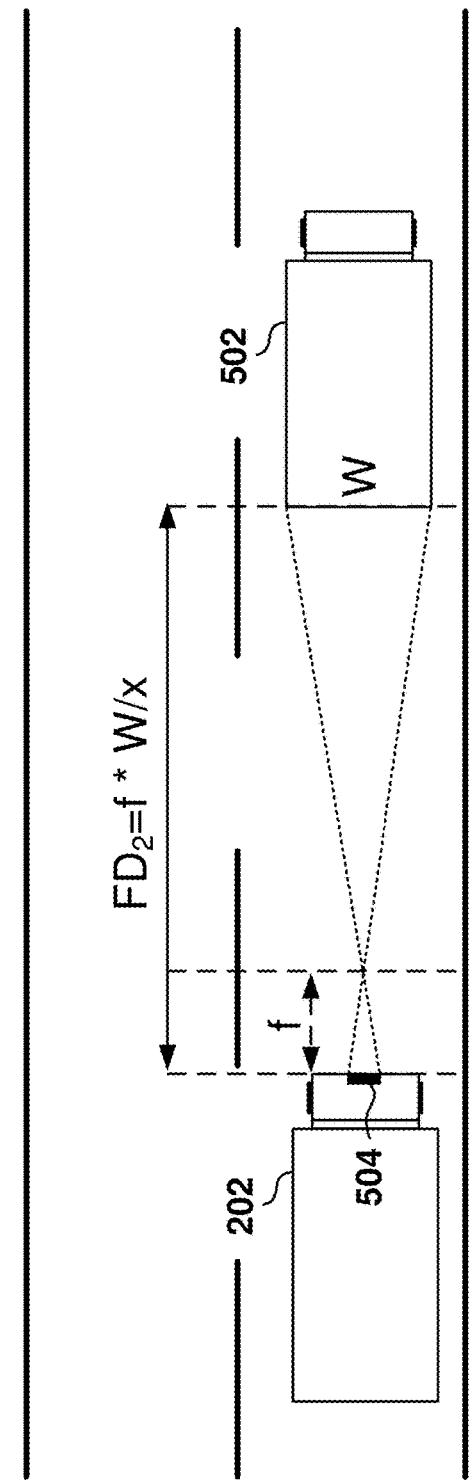

FIGS. 5A-5B illustrate methods to calculate the FD according to some examples. In some examples, the calculation of FD is based on image analysis and geometry to calculate the distance from the camera to the leading vehicle.

FIG. 5A shows a side view of the vehicle 202 with camera 504 following the lead vehicle 502. In some examples, triangle similarity is used to calculate FD based on the height H of the camera above the road, the focal length f of the camera measured in pixels, and a vertical measurement y associated with the focal length f and the line from the camera to the lead vehicle 502. In some examples, the FD is calculated with the following equation:

$$FD = f \cdot H/y \quad (1)$$

The f may be obtained from the camera datasheet and is independent of the vanishing point. In some examples, the H is approximated to two meters since typically the camera is installed at that height. However, other examples may include a configuration option for indicating the value of H for each vehicle 202. Equation (1) calculates the FD from the camera to the leading vehicle. In some examples, the FD is adjusted by subtracting the distance from the camera to the front of the vehicle.

FIG. 5A shows a top view of the road showing the vehicle 202 with camera 504 following the lead vehicle 502. In some examples, triangle similarity is used to calculate FD based on an estimation of the width W of the lead vehicle 502 (e.g., measured in meters) and the width x of the lead vehicle 502 measured in pixels in the images captured by the outward camera 504. In some examples, the FD is calculated with the following equation:

$$FD = f \cdot W/x \quad (2)$$

In some examples, the ML model is trained to identify the type of the lead vehicle 502, such as a truck or a sedan. Based on the vehicle type identified by the ML model based on image recognition of the outward images, the W is given an estimate based on vehicle type, such as 2.5 meters for trucks and 1.82 meters for sedans.

Equation (2) calculates the FD from the camera to the leading vehicle. In some examples, the FD is adjusted by subtracting the distance from the camera to the front of the vehicle.

After calculating the FD, a Safe Following Distance (SFD) can be calculated based on the amount of time to collision. The Safe Headway (SH) is the time needed to come to a complete stop without collision if the leading vehicle comes to a complete stop. Usually, SH is 3 seconds for cars under normal conditions, four or more seconds for SUVs and bigger cars, and the addition of one second for rainy, snowy, or windy conditions. The SFD, measured in meters, may be calculated with the following equation:

$$SFD = speed \cdot SH \quad (3)$$

In equation (3), speed refers to the speed of the vehicle 202. If speed is measured in miles per hour, then a factor of 1600/3600 may be added to equation (2) to convert to meters for SFD. In general, SFD will be between three and six seconds depending on the conditions on the road and the vehicle 202 (e.g., the SFD will be higher for vehicles with heavy loads).

The condition of unsafe following will be triggered when FD is less than SFD. In some examples, an unsafe score is calculated as follows:

$$\text{unsafe score} = \Sigma(FD < SFD)/\Sigma(\text{unsafe following events}) \quad (4)$$

Figure 6:
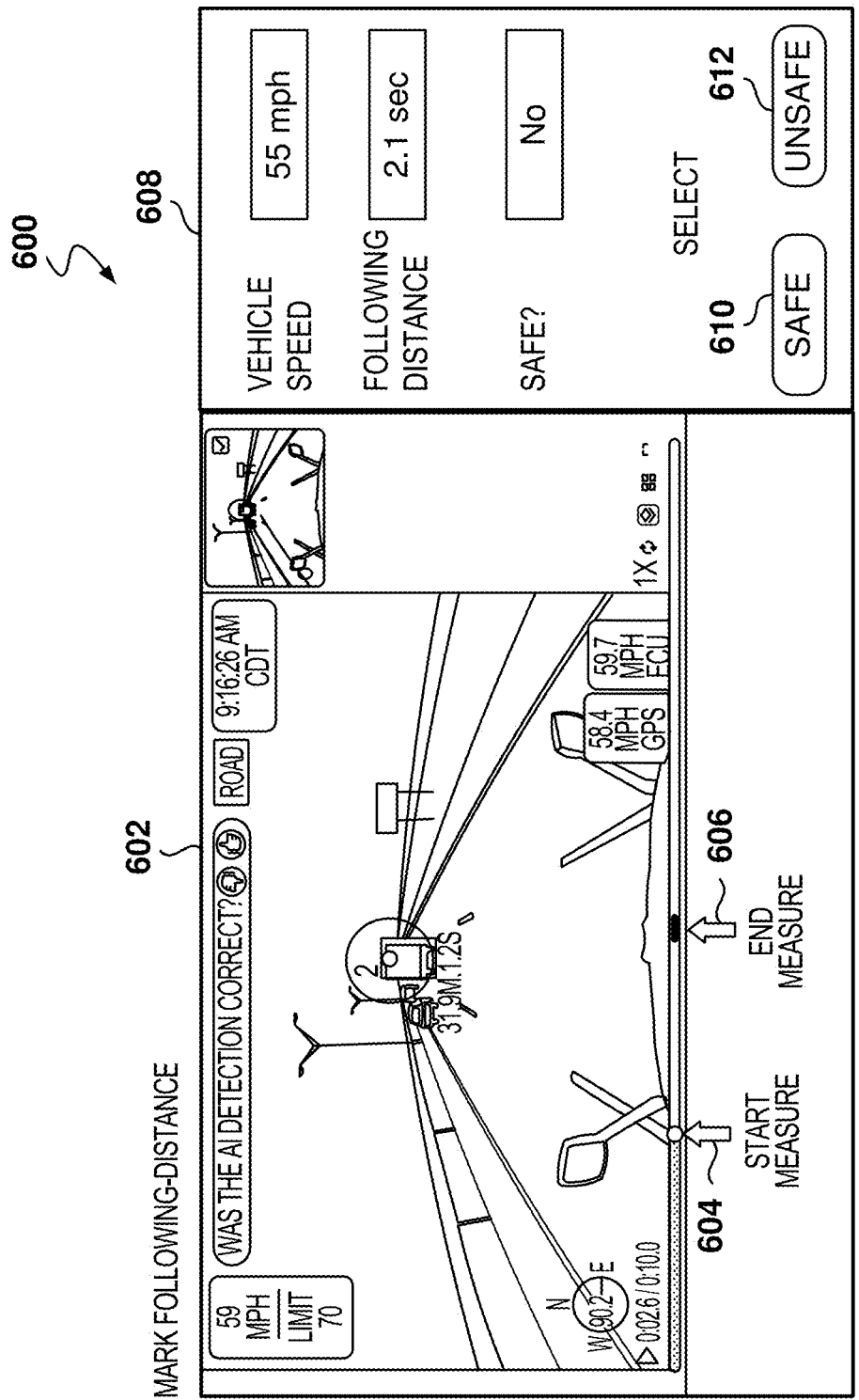
FIG. 6 is a UI for annotating following-distance (FD) events, according to some examples.

FIG. 6 is a UI 600 for annotating following-distance (FD) events, according to some examples. The UI 600 includes a video display area 602 showing a video from a forward-facing camera mounted on the vehicle. Superimposed on the video feed are graphical indicators that highlight the preceding vehicle and display the following distance measurement process.

In the video display area 602, the preceding vehicle is enclosed within a highlighted box, and a central alignment line extends from the bottom center of the display towards the detected vehicle, aiding in the assessment of the following distance.

As the user reviews the video, the user may flag two frames, where the first frame 604 indicates the beginning of the period for measuring FD, and the second frame 606 indicates the end of the measuring period. Typically, the user will mark the beginning frame as associated with the lead vehicle passing some landmark on the image (e.g., a traffic signal, the end of a stripe on the road) and the ending frame when the vehicle passes that landmark. Thus, the difference in time will be determined as the FD.

The beginning and end frames can be selected in different ways, such as a first click on a frame followed by a second click or by using different mouse signals, like the left button for the beginning and the right button for the end.

In the illustrated example, below the video feed, the interface presents the two markers start measure and end measure, that were selected by the user.

Adjacent to the video display area 602 is a data panel 608 that provides information related to the FD and vehicle operation. This data panel 608 displays the current speed of the subject vehicle and the FD in seconds, which represents the time gap between the subject vehicle and the lead vehicle. Additionally, the panel includes a safety assessment indicator (safe or not safe) followed by a selectable response indicating whether the current following distance is considered safe 610 or unsafe 612 to the preceding vehicle.

In the illustrated example, the reviewer has selected the first frame 604 and the second frame 606, so the FD is calculated as 2.1 seconds, based on the vehicle speed of 55 mph that is recorded on the video. The BMS then utilizes rules to determine if the distance is safe, and in this case, the determination is that the distance is not safe, so the reviewer should click the unsafe 612 option.

If the reviewer selects the safe option, the event will not be presented to the end customer, but if the reviewer selects the too-close option, the event will be provided to the end customer for review.

The UI 600 also includes a timestamp indicating the time and date of the event, as well as additional vehicle metrics such as speed readings from different sources (e.g., GPS and ECU). The overall layout is designed to provide the reviewer with information regarding FD and vehicle safety in a clear and intuitive manner.

With the UI 600, reviewers can see the time (e.g., seconds and deciseconds) at which a particular frame was taken, making it easy to measure the FD quickly. By subtracting the beginning timestamp from the end timestamp, the FD is calculated and presented automatically.

In some examples, the options 610 and 612 may be omitted, and the BMS will select if it is safe or not safe based on the calculation to determine safety; this way, the reviewer just has to mark the beginning frame and the end frame.

Figure 7:
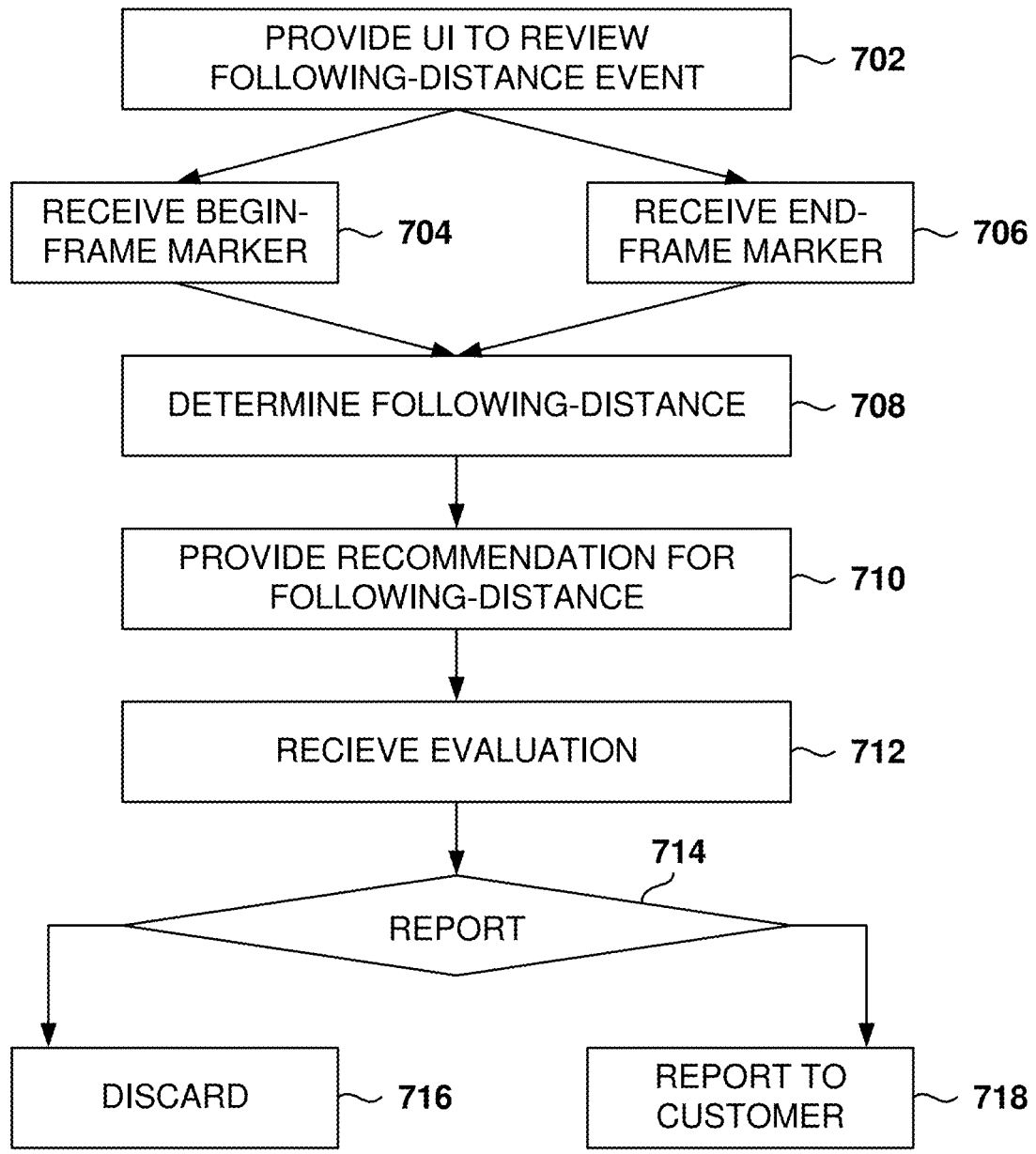
FIG. 7 is a flowchart of a method for processing FD events, according to some examples.

FIG. 7 is a flowchart of a method 700 for processing FD events, according to some examples. While the various operations in this flowchart are presented and described sequentially, one of ordinary skill will appreciate that some or all of the operations may be executed in a different order, be combined or omitted, or be executed in parallel.

Operation 702 is for providing a user interface (UI) to review a following-distance event.

From operation 702, the method 700 flows to operation 704 or operation 706. At operation 704, a begin-frame marker is received, indicating the start of an FD event. At operation 706, an end-frame marker is received.

Operation 708 is for determining the following distance based on the data captured between the begin-frame and end-frame markers. Once the following distance is determined, at operation 710, a recommendation is provided indicating if the FD is safe or unsafe. The recommendation calculation is based on parameters configured by the customer, as different customers will have different preferences. More details about these parameters are described below with reference to FIG. 8.

One or more rules may be used to determine if the FD event is safe or unsafe. A first rule will impose a minimum speed threshold, so if the vehicle is below the speed threshold, the FD events will be discarded. This helps eliminate FD events at low speeds since drivers tend to follow closer at lower speeds, and the danger is also lower at lower speeds.

A second rule will require that the FD event takes place for a predetermined amount of time, which means that the BMS will examine a plurality of frames to check that the FD event was not a short-lived one. For example, a customer may require that the FD event lasts for at least ten seconds, but other minimum periods of tailgating may be configured.

A third rule may require that the FD exceeds a predetermined threshold, such as 2.5 seconds, although other thresholds may also be configured. Thus, if a driver's FD is 2.6 seconds, then the event will be discarded.

At operation 714, a decision is made to either report or discard the event. If the decision is to discard the event, the method proceeds to operation 716, where the event data is discarded. If the decision is to report the event, the method continues to operation 718, where a report is generated, and the event is provided to the customer. The report may include details of the FD event, such as the measured FD.

Figure 8:
FIG. 8 is a UI for configuring FD-related parameters, according to some examples.
Figure 8:
Figure 8:
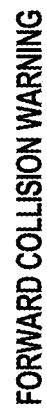

FIG. 8 is a UI 802 for configuring FD-related parameters, according to some examples. The UI 802 includes a section for AI event detection that provides options for FD detection, forward collision warning, and in-cab audio alerts 812. The AI event detection, when enabled, allows the monitoring of events associated with the vehicle and the driver, such as the options presented in FIG. 1, including the FD events.

The FD detection setting enables automatic detection of tailgating or unsafe following distances. The BMS will surface detected FD events in the customer's safety inbox. A note also indicates that FD events will impact the driver's safety score.

The FD-detection options include turning in-cab audio alerts 804 on or off, setting a speed threshold 806 for when the FD detection should be active, specifying the minimum duration 808 for which the behavior must be observed to trigger an alert, and setting the distance 810 in seconds that defines the minimum safe FD. The parameters configured with UI 802 are then used to configure the rules to determine when an FD event is safe or unsafe, as discussed above.

Another safety feature that can be configured in this interface is the forward collision warning, which allows the user to turn on or off in-cab audio alerts for forward collision warnings.

Figure 9:
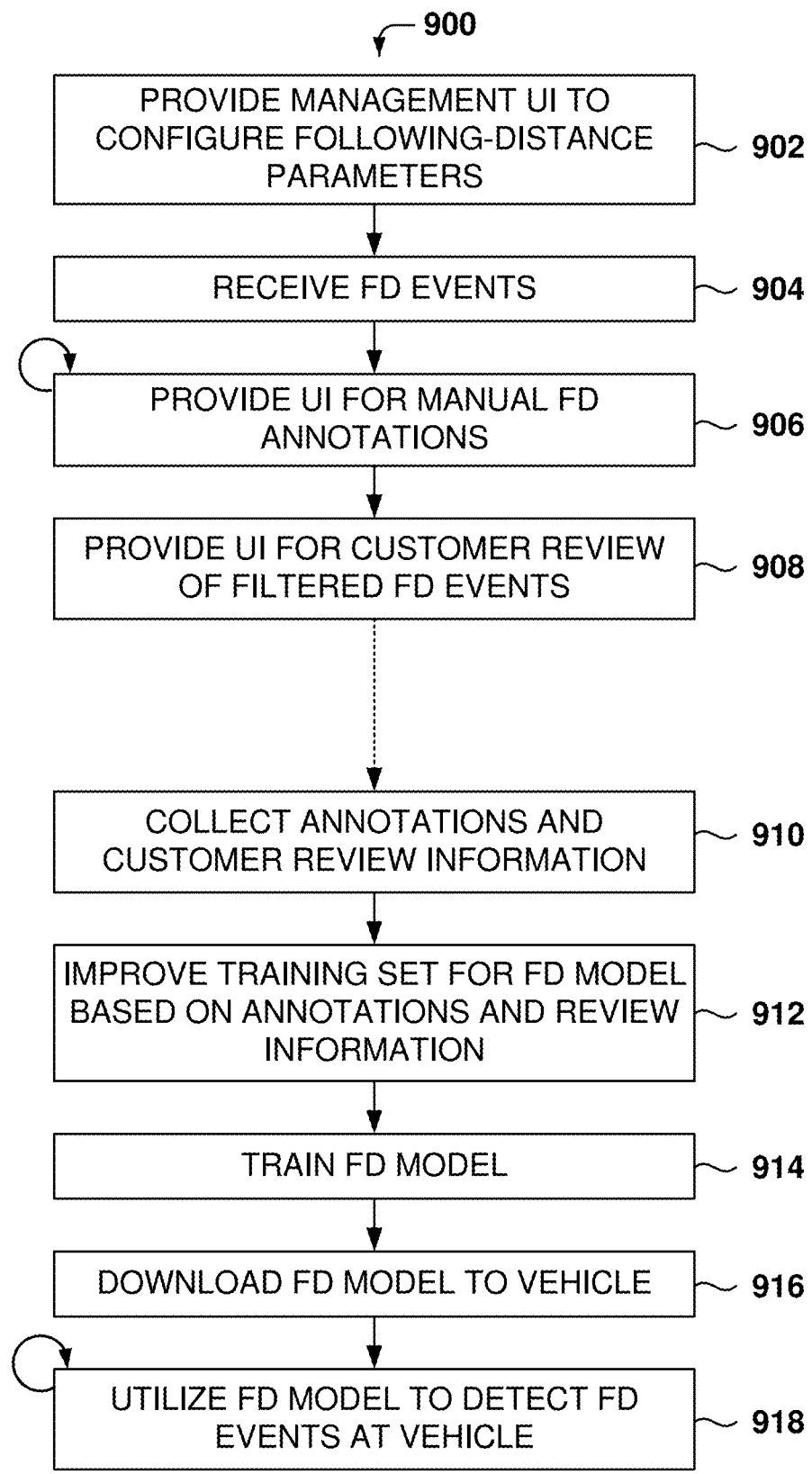
FIG. 9 is a flowchart of a method for improving an FD machine learning (ML) model, according to some examples.

FIG. 9 is a flowchart of a method 900 for improving an FD machine learning (ML) model, according to some examples. While the various operations in this flowchart are presented and described sequentially, one of ordinary skill will appreciate that some or all of the operations may be executed in a different order, be combined or omitted, or be executed in parallel.

At operation 902, a management user interface (UI) is provided to configure the following-distance parameters. This allows for the initial setup of the FD model.

From operation 902, the method 900 flows to operation 904, where FD events are received, e.g., when the AMS in the vehicle transmits the events to the BMS.

From operation 904, the method 900 flows to operation 906, where a UI is provided for manual FD annotations, such as the UI presented in FIG. 6. This UI enables users, such as agent annotators, to manually review and annotate FD events, which can help in refining the data that will be used to train the FD model.

From operation 906, the method 900 flows to operation 908, where a UI is provided for customer review of filtered FD events. This allows the end customers to review the FD events. The end customers may provide annotations on the reviewed FD events, such as whether the FD event was a true positive or a false positive.

Operation 910 involves collecting annotations and customer review information. The data gathered from the manual annotations and customer reviews are compiled to form a comprehensive set of information that may be used to enhance the training set of the ML model.

From operation 910, the method 900 flows to operation 912, where the training set for the FD model is improved based on the annotations and review information collected in the previous operation. This improved training set enhances the accuracy and reliability of the FD ML model.

From operation 912, the method 900 flows to operation 914 for training the FD model with the new data. This process adjusts the parameters of the model parameters to improve its ability to predict or detect FD events accurately.

From operation 914, the method 900 flows to operation 916 for downloading the FD model to a vehicle. The downloaded FD model is used to analyze inward images to determine FD events.

From operation 916, the method 900 flows to operation 918, where the FD model is utilized to detect FD events at the vehicle. The vehicle uses the updated FD model to monitor and analyze FD events, potentially improving safety and performance in driving scenarios.

Figure 10:
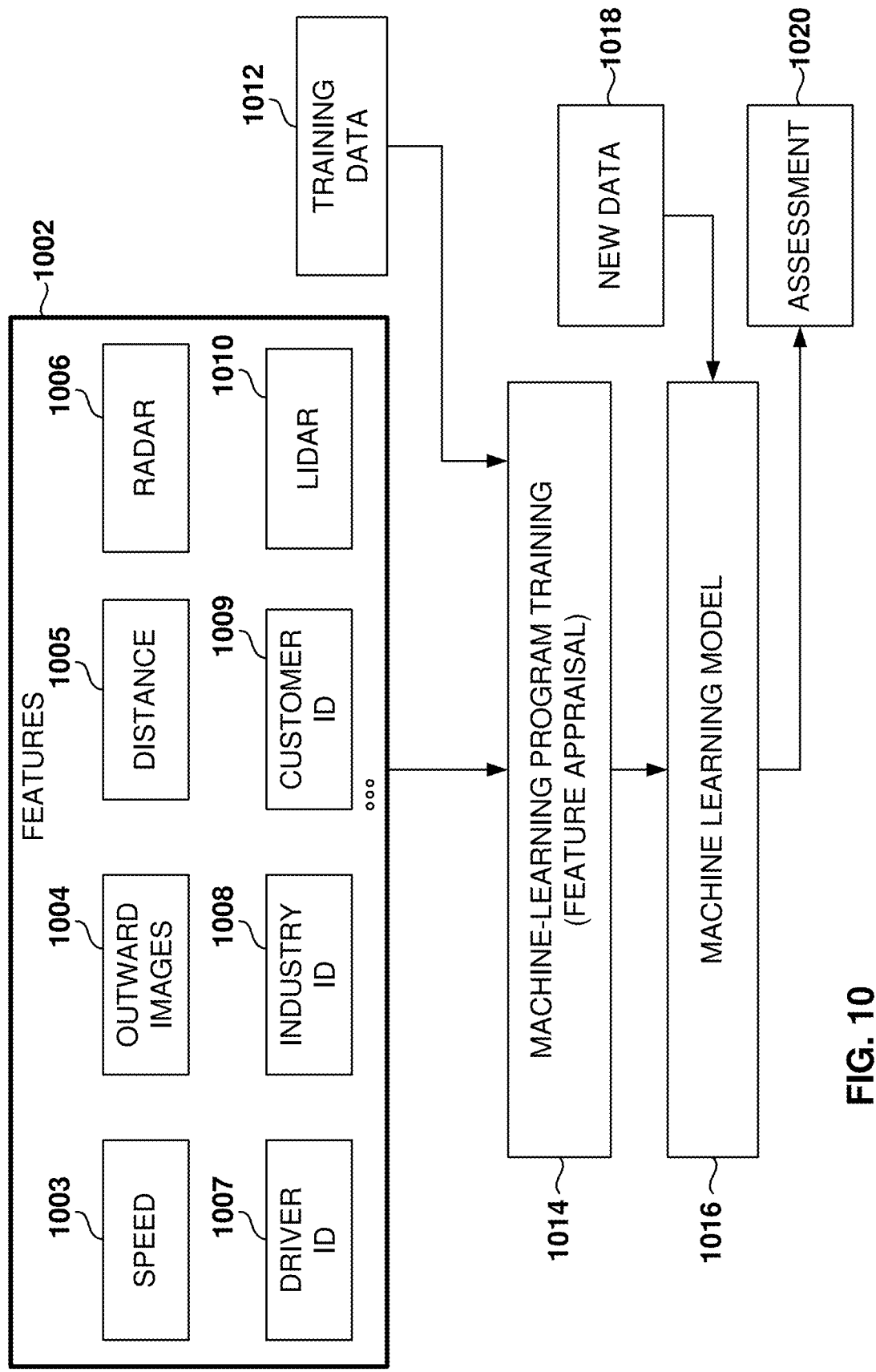
FIG. 10 illustrates the training and use of a machine-learning model, according to some example examples.

FIG. 10 illustrates the training and use of a machine-learning model 1016, according to some example examples. In some examples, machine learning (ML) models 1016 are utilized to perform operations associated with calculating the following distance.

Machine Learning (ML) is an application that provides computer systems the ability to perform tasks without explicitly being programmed by making inferences based on patterns found in the analysis of data. Machine learning explores the study and construction of algorithms, also referred to herein as tools, that may learn from existing data and make predictions about new data. Such machine-learning algorithms operate by building an ML model 1016 from training data 1012 in order to make data-driven predictions or decisions expressed as outputs or assessments 1020.

Although examples are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is essential so that the training is able to identify the correlations within the data.

In some examples, the images captured by the outward camera are embedded into vectors. A plurality of images are used to calculate the following distance. The images are sampled from the video by choosing a number of frames each second for the analysis for a predetermined number of seconds. In some examples, two frames are used per second for the last ten seconds, but other sampling frequencies and time windows may be used. Thus, twenty images are embedded and used as input to calculate the FD. The FD is calculated periodically, such as twice a second, but other calculating frequencies may also be used.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm, using information that is neither classified nor labeled and allowing the algorithm to act on that information without guidance. Unsupervised ML is useful in exploratory analysis because it can automatically identify structure in data.

Typical tasks for supervised ML are classification problems and regression problems. Classification problems, also referred to as categorization problems, aim to classify items into one of several category values (for example, is this object an apple or an orange?). Regression algorithms aim to quantify some items (for example, by providing a score to the value of some input). Some examples of commonly used supervised ML algorithms are Logistic Regression (LR), Naive-Bayes, Random Forest (RF), neural networks (NN), deep neural networks (DNN), matrix factorization, and Support Vector Machines (SVM).

Some typical tasks for unsupervised ML include clustering, representation learning, and density estimation. Some examples of commonly used unsupervised ML algorithms are K-means clustering, principal component analysis, and autoencoders. In some examples, ML model 1016 outputs a value in the drowsiness scale index for a time window (e.g., last ten seconds).

The training data 1012 comprises examples of values for the features 1002. In some examples, the training data comprises labeled data with examples of values for the features 1002 and labels indicating the outcome, such as drowsiness detected. The machine-learning algorithms utilize the training data 1012 to find correlations among identified features 1002 that affect the outcome. A feature 1002 is an individual measurable property of a phenomenon being observed. The concept of a feature is related to that of an explanatory variable used in statistical techniques such as linear regression. Choosing informative, discriminating, and independent features is essential for the effective operation of ML in pattern recognition, classification, and regression. Features may be of different types, such as numeric, strings, categorical, and graph. A categorical feature is a feature that may be assigned a value from a plurality of predetermined possible values (e.g., this animal is a dog, a cat, or a bird).

The more accurate the training data is, the more accurate the ML model 1016 will be. Further, according to some examples, a large number of images is used for the training, such as the images from 15,000 videos.

In one example, the features 1002 may be of different types and may include one or more of speed 1003, outward images 1004 from outward videos, distance 1005, Radio Detection and Ranging (RADAR) 1006, driver identifier 1007 (ID), industry ID 1008, customer ID 1009, Light Detection and Ranging (LIDAR) 1010, etc.

The industry ID provides valuable information, as different industries tend to have different requirements associated with types of vehicles, duration of trips, number of stops, etc. Some examples of types of industry include transportation & warehousing, wholesale trade, field services, passenger transit, construction, consumer products, retail trade, food & beverage, manufacturing, health care & social assistance, etc.

During training 1014, the ML program, also referred to as ML algorithm or ML tool, analyzes the training data 1012 based on identified features 1002 and configuration parameters defined for the training. The result of the training 1014 is the ML model 1016, which is capable of taking inputs to produce assessments.

The annotations performed by agents provide valuable information for the training, and the information captured via annotation is incorporated in the training data in the distance 1005 feature. During testing, the use of the annotations performed by reviewers and end customers improved the accuracy of the ML model 1016, and as more annotations are obtained, the accuracy of the ML model 1016 will continue to improve.

Training an ML algorithm involves analyzing large amounts of data (e.g., from several gigabytes to a terabyte or more) in order to find data correlations. The ML algorithms utilize the training data 1012 to find correlations among the identified features 1002 that affect the outcome or assessment 1020. In some examples, the training data 1012 includes labeled data, which is known data for one or more identified features 1002 and one or more outcomes, such as the calculation of the FD in deciseconds.

The ML algorithms usually explore many possible functions and parameters before finding what the ML algorithms identify to be the best correlations within the data; therefore, training may make use of large amounts of computing resources and time.

When the ML model 1016 is used to perform an assessment, new data 1018 is provided as input to the ML model 1016, and the ML model 1016 generates the assessment 1020 as output. For example, when analyzing the different inputs for a ten-second window (e.g., outward frames and vehicle speed), the ML model 1016 calculates the FD (e.g., distance in seconds).

In some examples, the input to the model may also include the type of vehicle for the leading vehicle, which indicates the size of the vehicle to assist in measuring distances. Other examples may not use the vehicle type as an input, and the ML model will implicitly estimate this value based on how it was trained with this type of information.

In some examples, results obtained by the model 1016 during operation (e.g., assessment 1020 produced by the model in response to inputs) are used to improve the training data 1012, which is then used to generate a newer version of the model. Thus, a feedback loop is formed to use the results obtained by the model to improve the model. In some examples, the ML program is one of Residual Network (ResNet) model or a video transformer, but other examples may utilize other types of models.

Feature extraction is a process that reduces the amount of resources required to describe a large set of data. When performing analysis of complex data, one of the major problems stems from the number of variables involved. Analysis with a large number of variables generally requires a large amount of memory and computational power, and it may cause a classification algorithm to overfit training samples and generalize poorly to new samples. Feature extraction includes constructing combinations of variables to get around these large-data-set problems while still describing the data with sufficient accuracy for the desired purpose.

In some examples, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same or a similar amount of information.

The improvement in the quality of the ML model 1016 to calculate the FD will result in benefits for the service provider and the end customer. The service provider benefits because of the reduction in false positives with a more accurate model, and the fewer false positives, the less time has to be spent on reviewers to review the FD events. Similarly, the end customer will benefit when there are fewer FD events that need to be reviewed by the reduction of false positives.

Figure 11:
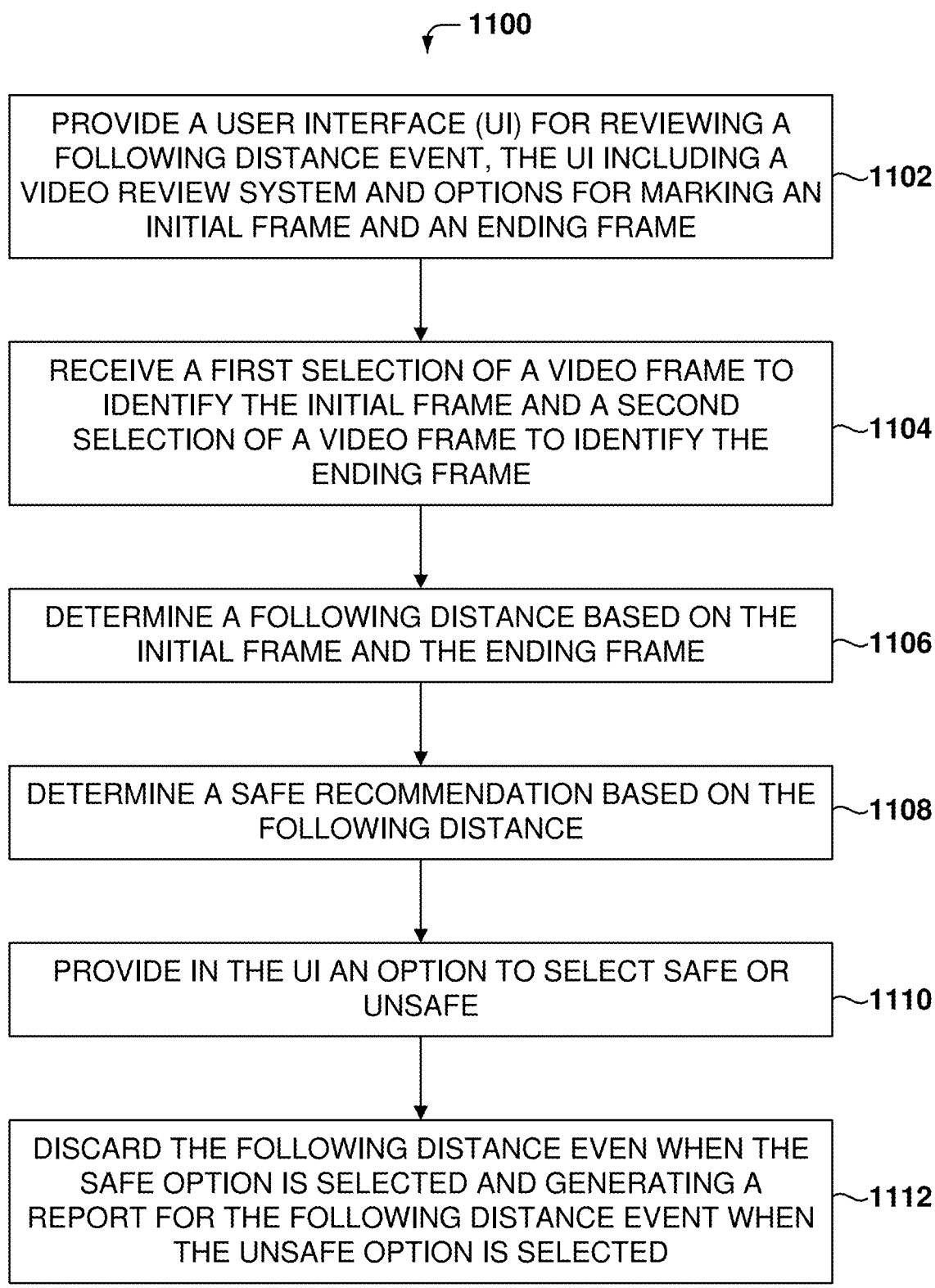
FIG. 11 is a flowchart of a method for monitoring tailgating when a vehicle follows another vehicle at an unsafe distance, according to some examples.

FIG. 11 is a flowchart of a method 1100 for monitoring tailgating when a vehicle follows another vehicle at an unsafe distance, according to some examples. While the various operations in this flowchart are presented and described sequentially, one of ordinary skill will appreciate that some or all of the operations may be executed in a different order, be combined or omitted, or be executed in parallel.

Operation 1102 is for providing a user interface (UI) for reviewing a following distance event, the UI includes a video review system and options for marking an initial frame and an ending frame.

From operation 1102, the method 1100 flows to operation 1104 for receiving a first selection of a video frame to identify the initial frame and a second selection of a video frame to identify the ending frame.

From operation 1104, the method 1100 flows to operation 1106 to determine the following distance based on the initial frame and the ending frame.

From operation 1106, the method 1100 flows to operation 1108 for determining a safe recommendation based on the following distance.

From operation 1108, the method 1100 flows to operation 1110 to provide in the UI an option to select safe or unsafe.

From operation 1110, the method 1100 flows to operation 1112 for discarding the following distance even when the safe option is selected and generating a report for the following distance event when the unsafe option is selected.

In some examples, the method 1100 further comprises collecting a plurality of following distance events and respective safe or unsafe selections, and generating a training set comprising information on the plurality of following distance events and the safe or unsafe selections.

In some examples, the training set is based on features comprising one or more of vehicle speed, images, distance, and type of industry.

In some examples, the method 1100 further comprises training, using the training set, a machine learning model that inputs image frames in a vehicle and outputs the following distance of the vehicle.

In some examples, the method 1100 further comprises downloading the machine learning model to another vehicle for determining the following distance during a trip.

In some examples, determining the safe recommendation comprises accessing one or more rules for determining the safe recommendation, the one or more rules being based on vehicle speed, a minimum speed for the vehicle to trigger the following distance event, a duration of the following distance event, and a minimum time of the following distance event.

In some examples, the method 1100 further comprises providing an alarm in the vehicle when a following distance event is detected.

In some examples, the method 1100 further comprises providing another UI to configure following distance options comprising providing audio alerts in the vehicle, a minimum speed for triggering following distance events, a minimum duration of the following distance event for triggering, and a minimum following distance value for triggering following distance events.

In some examples, a camera module in the vehicle comprises an outward camera, an inward camera, computer memory, and a computer processor for determining the following distance.

In some examples, the method 1100 further comprises providing an end-user event review UI to review driving-related events identified for a fleet of vehicles, the driving-related events comprising following distance, speeding, harsh turn, and inattentive driving.

Another general aspect is for a system that includes a memory comprising instructions and one or more computer processors. The instructions, when executed by the one or more computer processors, cause the one or more computer processors to perform operations comprising: providing a user interface (UI) for reviewing a following distance event, the UI including a video review system and options for marking an initial frame and an ending frame; receiving a first selection of a video frame to identify the initial frame and a second selection of a video frame to identify the ending frame; determining a following distance based on the initial frame and the ending frame; determining a safe recommendation based on the following distance; providing in the UI an option to select safe or unsafe; and discarding the following distance even when the safe option is selected and generating a report for the following distance event when the unsafe option is selected.

In yet another general aspect, a tangible machine-readable storage medium (e.g., a non-transitory storage medium) includes instructions that, when executed by a machine, cause the machine to perform operations comprising: providing a user interface (UI) for reviewing a following distance event, the UI including a video review system and options for marking an initial frame and an ending frame; receiving a first selection of a video frame to identify the initial frame and a second selection of a video frame to identify the ending frame; determining a following distance based on the initial frame and the ending frame; determining a safe recommendation based on the following distance; providing in the UI an option to select safe or unsafe; and discarding the following distance even when the safe option is selected and generating a report for the following distance event when the unsafe option is selected.

Figure 12:
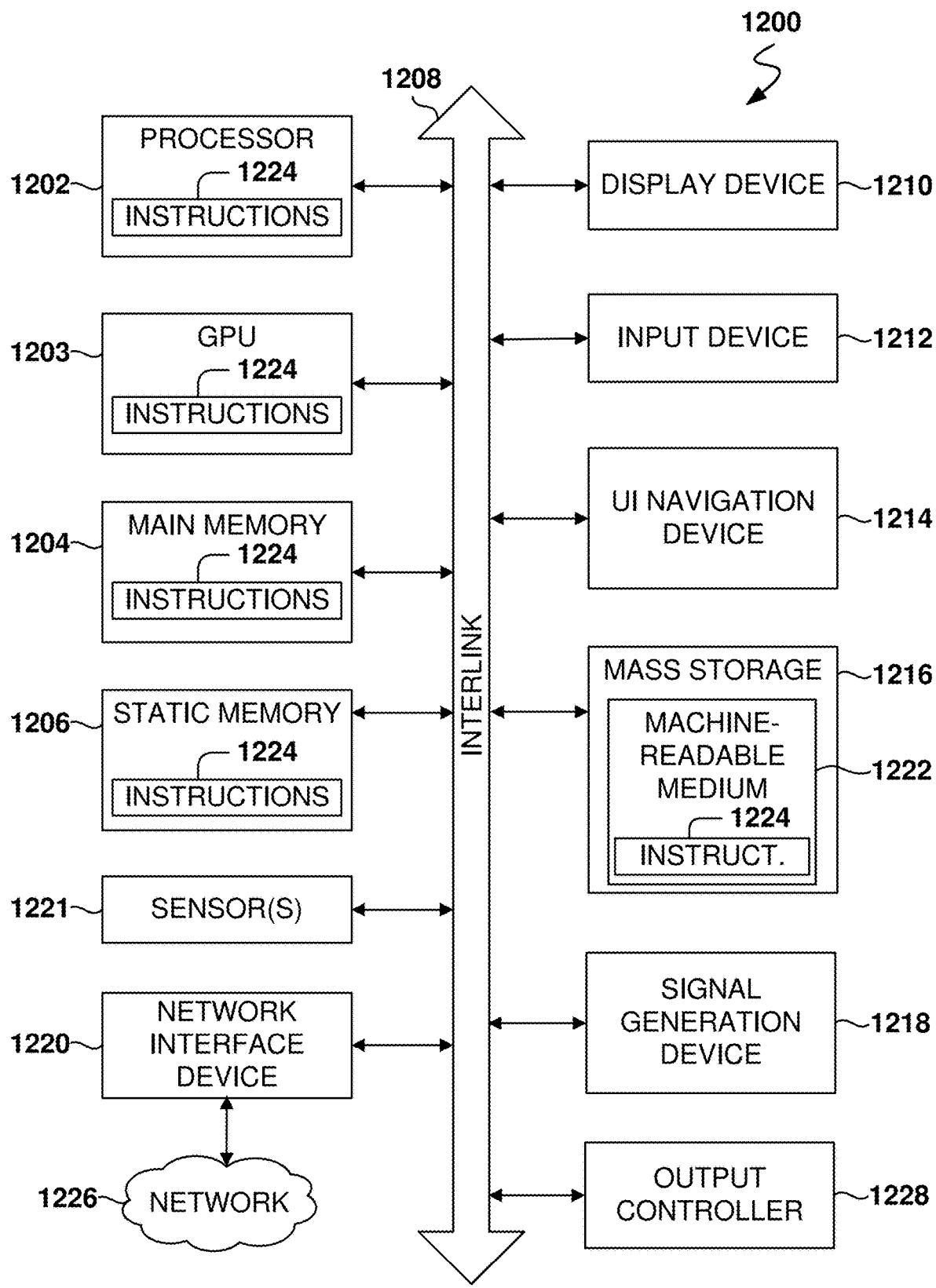
FIG. 12 is a block diagram illustrating an example of a machine upon or by which one or more example process examples described herein may be implemented or controlled.

FIG. 12 is a block diagram illustrating an example of a machine 1200 upon or by which one or more example process examples described herein may be implemented or controlled. In alternative examples, the machine 1200 may operate as a standalone device or be connected (e.g., networked) to other machines. In a networked deployment, the machine 1200 may operate in the capacity of a server machine, a client machine, or both in server-client network environments. In an example, the machine 1200 may act as a peer machine in a peer-to-peer (P2P) (or other distributed) network environment. Further, while only a single machine 1200 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1200 (e.g., computer system) may include a hardware processor 1202 (e.g., a central processing unit (CPU), a hardware processor core, or any combination thereof), a graphics processing unit (GPU 1203), a main memory 1204, and a static memory 1206, some or all of which may communicate with each other via an interlink 1208 (e.g., bus). The machine 1200 may further include a display device 1210, an alphanumeric input device 1212 (e.g., a keyboard), and a user interface (UI) navigation device 1214 (e.g., a mouse). In an example, the display device 1210, alphanumeric input device 1212, and UI navigation device 1214 may be a touch screen display. The machine 1200 may additionally include a mass storage device 1216 (e.g., drive unit), a signal generation device 1218 (e.g., a speaker), a network interface device 1220, and one or more sensors 1221, such as a Global Positioning System (GPS) sensor, compass, accelerometer, or another sensor. The machine 1200 may include an output controller 1228, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1202 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1202 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1202 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1202 may be emulated in software, running on a physical processor, as a virtual processor or virtual circuit. The virtual processor may behave like an independent processor but is implemented in software rather than hardware.

The mass storage device 1216 may include a machine-readable medium 1222 on which one or more sets of data structures or instructions 1224 (e.g., software) embodying or utilized by any of the techniques or functions described herein. The instructions 1224 may also reside, completely or at least partially, within the main memory 1204, within the static memory 1206, within the hardware processor 1202, or the GPU 1203 during execution thereof by the machine 1200. For example, one or any combination of the hardware processor 1202, the GPU 1203, the main memory 1204, the static memory 1206, or the mass storage device 1216 may constitute machine-readable media.

While the machine-readable medium 1222 is illustrated as a single medium, the term "machine-readable medium" may include a single medium or multiple media (e.g., a centralized or distributed database and associated caches and servers) configured to store one or more instructions 1224.

The term "machine-readable medium" may include any medium that is capable of storing, encoding, or carrying instructions 1224 for execution by the machine 1200 and that causes the machine 1200 to perform any one or more of the techniques of the present disclosure or that is capable of storing, encoding, or carrying data structures used by or associated with such instructions 1224. Non-limiting machine-readable medium examples may include solid-state memories and optical and magnetic media. For example, a massed machine-readable medium comprises a machine-readable medium 1222 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may be transmitted or received over a communications network 1226 using a transmission medium via the network interface device 1220.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:
   providing a user interface (UI) for reviewing a following distance event, the UI including a video review system and options for marking an initial frame and an ending frame of a video recording;
   receiving a first selection of a video frame to identify the initial frame in the video recording and a second selection of a video frame to identify the ending frame in the video recording, the initial frame based on a location of a leading vehicle and the ending frame based on a location of a trailing vehicle;
   determining a following distance between the leading vehicle and the trailing vehicle based on a distance traveled by the trailing vehicle between the initial frame and the ending frame;
   determining a safe recommendation based on the following distance, the safe recommendation indicating if the trailing vehicle is following at a safe distance;
   providing in the UI for presenting the safe recommendation and an option to select safe or unsafe; and
   generating a report for the following distance event in response to receiving a selection of unsafe.

2. The method as recited in claim 1, further comprising:
   collecting a plurality of following distance events and respective safe or unsafe selections; and
   generating a training set comprising information on the plurality of following distance events and the safe or unsafe selections.

3. The method as recited in claim 2, wherein the training set is based on features comprising one or more of vehicle speed, images, distance, and type of industry.

4. The method as recited in claim 2, further comprising:
   training, using the training set, a machine learning model that inputs image frames in a vehicle and outputs the following distance of the vehicle.

5. The method as recited in claim 4, further comprising:
   downloading the machine learning model to another vehicle for determining following distance during a trip.

6. The method as recited in claim 1, wherein determining the safe recommendation comprises:
   accessing one or more rules for determining the safe recommendation, the one or more rules being based on a speed of the trailing vehicle, a minimum speed for the trailing vehicle to trigger the following distance event, and a duration of the following distance event.

7. The method as recited in claim 1, further comprising:
   providing an alarm in the trailing vehicle when a following distance event is detected.

8. The method as recited in claim 1, further comprising:
   providing another UI to configure following distance options comprising provide audio alerts in the vehicle, a minimum speed for triggering following distance events, a minimum duration of the following distance event for triggering, and a minimum following distance value for triggering following distance events.

9. The method as recited in claim 1, wherein a camera module in the vehicle comprises an outward camera, an inward camera, computer memory, and a computer processor for determining the following distance.

10. The method as recited in claim 1, further comprising:
    providing an end-user event review UI to review driving-related events identified for a fleet of vehicles, the driving-related events comprising following distance, speeding, harsh turn, and inattentive driving.

11. The method as recited in claim 1, further comprising:
    discarding the following distance event when the safe option is selected.

12. A system comprising:
a memory comprising instructions; and
one or more computer processors, wherein the instructions, when executed by the one or more computer processors, cause the system to perform operations comprising:
  providing a user interface (UI) for reviewing a following distance event, the UI including a video review system and options for marking an initial frame and an ending frame of a video recording;
  receiving a first selection of a video frame to identify the initial frame in the video recording and a second selection of a video frame to identify the ending frame in the video recording, the initial frame based on a location of a leading vehicle and the ending frame based on a location of a trailing vehicle;
  determining a following distance between the leading vehicle and the trailing vehicle based on a distance traveled by the trailing vehicle between the initial frame and the ending frame;
  determining a safe recommendation based on the following distance, the safe recommendation indicating if the trailing vehicle is following at a safe distance;
  providing in the UI for presenting the safe recommendation and an option to select safe or unsafe; and
  generating a report for the following distance event in response to receiving a selection of unsafe.

13. The system as recited in claim 12, wherein the instructions further cause the one or more computer processors to perform operations comprising:
  collecting a plurality of following distance events and respective safe or unsafe selections; and
  generating a training set comprising information on the plurality of following distance events and the safe or unsafe selections.

14. The system as recited in claim 13, wherein the training set is based on features comprising one or more of vehicle speed, images, distance, and type of industry.

15. The system as recited in claim 13, wherein the instructions further cause the one or more computer processors to perform operations comprising:
  training, using the training set, a machine learning model that inputs image frames in a vehicle and outputs the following distance of the vehicle.

16. The system as recited in claim 15, wherein the instructions further cause the one or more computer processors to perform operations comprising:
  downloading the machine learning model to another vehicle for determining following distance during a trip.

17. A non-transitory machine-readable storage medium including instructions that, when executed by a machine, cause the machine to perform operations comprising:
  providing a user interface (UI) for reviewing a following distance event, the UI including a video review system and options for marking an initial frame and an ending frame of a video recording;
  receiving a first selection of a video frame to identify the initial frame in the video recording and a second selection of a video frame to identify the ending frame in the video recording, the initial frame based on a location of a leading vehicle and the ending frame based on a location of a trailing vehicle;
  determining a following distance between the leading vehicle and the trailing vehicle based on a distance traveled by the trailing vehicle between the initial frame and the ending frame;
  determining a safe recommendation based on the following distance, the safe recommendation indicating if the trailing vehicle is following at a safe distance;
  providing in the UI for presenting the safe recommendation and an option to select safe or unsafe; and
  generating a report for the following distance event in response to receiving a selection of unsafe.

18. The non-transitory machine-readable storage medium as recited in claim 17, wherein the machine further performs operations comprising:
  collecting a plurality of following distance events and respective safe or unsafe selections; and
  generating a training set comprising information on the plurality of following distance events and the safe or unsafe selections.

19. The non-transitory machine-readable storage medium as recited in claim 18, wherein the training set is based on features comprising one or more of vehicle speed, images, distance, and type of industry.

20. The non-transitory machine-readable storage medium as recited in claim 18, wherein the machine further performs operations comprising:
  training, using the training set, a machine learning model that inputs image frames in a vehicle and outputs the following distance of the vehicle.

* * * * *